(12) United States Patent
Bäbler

(10) Patent No.: US 6,264,733 B1
(45) Date of Patent: Jul. 24, 2001

(54) PIGMENT PARTICLE GROWTH AND/OR CRYSTAL PHASE DIRECTORS

(75) Inventor: Fridolin Bäbler, Hockessin, DE (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/496,494

(22) Filed: Feb. 2, 2000

Related U.S. Application Data

(60) Provisional application No. 60/118,405, filed on Feb. 2, 1999.

(51) Int. Cl.$^7$ .................. C09B 48/00; C07D 471/04
(52) U.S. Cl. .................. 106/495; 106/497; 544/125; 544/300; 544/361; 546/49; 546/56; 546/57
(58) Field of Search .................. 546/49, 56, 57; 106/495, 497; 544/300, 361, 125

(56) References Cited

U.S. PATENT DOCUMENTS

| | | | |
|---|---|---|---|
| 3,386,843 | 6/1968 | Jaffe et al. | 106/288 |
| 4,451,398 | * 5/1984 | Patsch | 260/154 |
| 5,194,088 | 3/1993 | Babler et al. | 106/412 |
| 5,286,863 | * 2/1994 | Babler | 546/49 |
| 5,334,727 | * 8/1994 | Campbell | 548/373.1 |
| 5,368,641 | * 11/1994 | Dietz | 106/495 |
| 5,424,429 | 6/1995 | Hendi et al. | 546/49 |
| 5,755,873 | 5/1998 | Badjo et al. | 106/497 |
| 5,840,901 | 11/1998 | Babler | 546/49 |

FOREIGN PATENT DOCUMENTS

| | | |
|---|---|---|
| 0 685 530 | 12/1995 | (EP). |
| 790281 | * 8/1997 | (EP). |
| 0 643 110 | 1/1999 | (EP). |
| 1 544 839 | 4/1979 | (GB). |
| 02180884 | * 7/1990 | (JP). |
| 727664 | * 4/1980 | (SU). |

* cited by examiner

Primary Examiner—Evelyn Mei Huang
(74) Attorney, Agent, or Firm—David R. Crichton

(57) ABSTRACT

Pigment particle growth and/or crystal phase directors of the following formula:

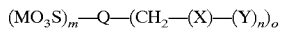

$$(MO_3S)_m—Q—(CH_2—(X)—(Y)_n)_o$$

wherein:

Q represents a pigment moiety;

M represents a metal cation, quaternary N cation or H;

X is an aromatic group, a cyclo-hetero aliphatic group with at least one 5 atom or 6 atom ring or a hetero aromatic group with at least one 6 atom ring and which is not a phthalimido group;

Y is a sulfonic or carboxylic acid or salt thereof;

m and n independently from each other represent an integer from 0 to 2.5; and o is an integer from 0.05 to 4.

19 Claims, No Drawings

PIGMENT PARTICLE GROWTH AND/OR CRYSTAL PHASE DIRECTORS

This application claims the benefit under 35 U.S.C. 119(e) of U.S. Provisional Application No. 60/118,405, filed Feb. 2, 1999.

FIELD OF THE INVENTION

The present invention relates to novel compounds which can direct and control the growth and/or crystal phase of pigment particles. Such compounds are particularly useful when present during the synthesis of the pigment.

BACKGROUND OF THE INVENTION

A number of patents describe processes for the direct synthesis of pigments in a pigmentary form to avoid the additional expensive and oftentimes environmentally unfriendly pigment finishing processes (e.g. processes for particle size reduction and/or crystal-form modification). For example European Patent No. 643,110 and U.S. Pat. No. 5,424,429 describe a direct synthesis of quinacridone solid solutions and 2,9-dichloroquinacridone in pigmentary form, respectively, in the presence of quinacridone phthalimidomethyl derivatives. European Patent No. 685,530 describes the preparation of a direct synthesis of pigmentary grade dioxazine in the presence of a dioxazine derivative.

It is also known that sulfonic acid derivatives of certain pigments can effectively diminish the crystal growth during the isolation of the pigment from a reaction mixture. Such sulfonic acid derivatives are described, for example, in U.S. Pat. No. 3,386,843. Other patents describe the use of sulfonic acid derivatives of pigments to stabilize against recrystallization and change of crystal modification as, for example, in G.B. Patent No. 1,544,839 which is directed to phthalocyanine pigments.

U.S. Pat. No. 5,755,873 describes a method for the preparation of quinacridone pigments in which a quinacridone derivative is incorporated during synthesis and copending provisional application Ser. No. 60/087,773 describes a direct synthesis of pigmentary diketopyrrolopyrrole pigments in the presence of quinacridone or diketopyrrolopyrrole derivatives.

Although the addition of such known pigment derivatives can be advantageous, pigment synthesis in the presence of such derivatives in many cases does not provide the favored pigmentary crystal size, shape or crystal modification. Therefore many pigments so synthesized may still require finishing steps to obtain pigments with the preferred color characteristics.

SUMMARY OF THE INVENTION

The present invention is based on the discovery that new selected pigment derivatives in which a specific aromatic or hetero aromatic group is linked by a methylene group to a pigment molecule are particularly effective for directing and controlling the growth and/or crystal modification of pigment particles when present during the pigment synthesis step.

Such pigment particle growth directors can be prepared by simple synthesis procedures and offer the pigment manufacturer a means to prepare a pigment providing the preferred color characteristic without requiring additional pigment finishing step. The inventive compounds allow the manufacturer to produce high performance organic pigments in an economical and environmentally friendly manner of producing high performance organic pigments and thus, are of extreme commercial importance.

DETAILED DESCRIPTION OF A PREFERRED EMBODIMENT

The present invention relates to novel compounds of formula I:

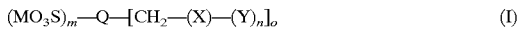

$$(MO_3S)_m\text{—}Q\text{—}[CH_2\text{—}(X)\text{—}(Y)_n]_o \qquad (I)$$

wherein Q represents a pigment moiety, M represents a metal cation, quaternary N cation or H, X is a aromatic group or a cyclo hetero aliphatic group with at least one 5 or 6 atom ring or a hetero aromatic group with at least one 6 atom ring and which is not a phthalimido group, Y is a sulfonic acid or carboxylic acid or salt thereof, m and n independent of one another are numbers from zero to 2.5, and o is a number from 0.05 to 4. The present invention further relates to a process for the preparation and use of such compounds.

Generally, the pigment moiety Q is a pigment selected from the group of anthraquinone, phthalocyanine, perinone, perylene, diketopyrrolopyrrole, thioindigo, iminoisoindoline, iminoisoindolinone, quinacridone, flavanthrone, dioxazine, indanthrone, anthrapyrimidine and quinophthalone pigments. Preferably, the pigment moiety Q is a quinacridone or diketo pyrrolo pyrrole pigment. Particularly preferably, the pigment moiety Q is a quinacridone of the general formula II:

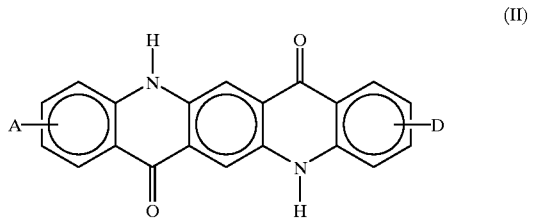

(II)

wherein A and D are independently 1 or 2 substituents selected from H, F, Cl, $C_1$–$C_3$ alkyl and $C_1$–$C_3$ alkoxy. The pigment moiety Q is not a compound that produces colorless derivatives, such as derivatives of 6,13-dihydroquinacridones. Most preferably the pigment moiety Q is an unsubstituted quinacridone.

Preferably, m of formula I is a number from about zero to 0.5, most preferably zero to 0.1; n is a number from about zero to 2, most preferably from about zero to 1.2; and o is a number from about 0.1 to 2, most preferably from about 0.2 to 1.5. The values for m, n and o are determined by analytical methods like mass spectrometry such as LCMS, GCMS or the matrix-assisted laser desorption ionization technique (MALDI).

The metal cation M of formula I is preferably sodium, potassium, calcium, magnesium or aluminum. The quaternary N cation of formula 1 is an ammonium or an alkyl ammonium group.

Typically, the group X of formula I is an aromatic group with a 5 carbon or 6 carbon ring; or a polycyclic group containing two to six fused 5 carbon and/or 6 carbon rings; a cyclo-herto aliphatic group including at least one 5 atom or 6 atom ring; or a hetero aromatic group, which is not a phthalimido, and includes a 6 atom ring, fused 6 atom rings or fused 5 and 6 atom rings and in which there are 1 to 4 hetero atoms of N, S and/or O. Suitable aromatic groups include, for example, phenylene, naphthalene, acenaphthylene, anthracene, phenanthrene, naphthacene, chrysene, pyrene or perylene. Preferably the aromatic group is phenylene, naphthalene, anthracene or pyrene, and most preferably the aromatic group is phenylene or naphthalene.

Cyclo-hetero aliphatic groups are, for example, pyrrolidine, imidazolidine, piperidine, piperazine or morpholine.

Appropriate hetero aromatic groups are, for instance, pyridine, pyrazine, pyrimidine, pyridazine, indole, isoindole, quinoline, isoquinoline, carbazole, phenothiazine, benzimidazolone or benzothiazole, preferably pyridine or carbazole.

The above exemplified aromatic, cyclo hetero aliphatic or hetero aromatic groups can optionally be substituted with one or more halogen, oxy, hydroxy, imino, amino and/or $C_1$–$C_{18}$alkyl groups, preferably $C_1$–$C_3$alkyl or $C_1$–$C_3$alkoxy groups.

Examples of the large number of such substituted groups are for instance toluene, ortho-, meta- or para-xylene, chlorobenzene, 1- or 2-methylnaphthalene or anthraquinone, barbituric acid, melamine, 1,3,7-trimethylxanthin, hydantoin, 2-methylbenzimidazole, 2,6,8-trihydroxypurine, 1,8-naphtosultam, o-benzoic acid sulfimide or 2,4-dihydroxyprimidine.

Preferred aromatic groups are toluene, ortho-, meta- or para-xylene, chlorobenzene, 1- or 2-methylnaphthalene or anthraquinone. Preferred hetero aromatic groups are melamine, 1,3,7-trimethylxanthin, hydantoin, 2-methylbenzimidazole, 2,6,8-trihydroxypurine, 1,8-naphtosultam, o-benzoic acid sulfimide or 2,4-dihydroxyprimidine.

Commonly the group Y is a carboxylic acid or a sulfonic acid group. Most preferably the group Y is a free sulfonic acid or a sodium, potassium, magnesium, calcium or aluminum salt thereof.

A further embodiment of the present invention is a process for the preparation of compounds of formula I or II, wherein: a) the pigment of the pigment moiety Q is dissolved in concentrated sulfuric acid; b) the intermediate X is added into the solution and dissolved at a temperature below 50° C.; c) para-formaldehyde is added at a temperature below 50° C.; d) and then is heated to a temperature from to 50 to 100° C.; e) and then isolated.

The inventive compounds are prepared for example by a process in which the pigment moiety Q and the intermediate X, a substantial portion of which is the moiety of group X, are reacted with formaldehyde. Preferably the reaction is carried out in concentrated (95–98%) sulfuric acid. In one preferred method, the pigment of the pigment moiety Q is dissolved in concentrated sulfuric acid at a concentration of about 5 to 30 weight percent, most preferably about 10 to 20 weight percent at a temperature below about 50° C., preferably at about 35 to 45° C. The intermediate X is added to the pigment solution at a temperature below about 50° C., preferably at about 35 to 45° C. and is also dissolved. Finally the formaldehyde is added, preferably in the form of paraformaldehyde, at a temperature below about 50° C., preferably at about 35 to 45° C. The reaction mixture is heated to a temperature from about 50 to 100° C. and stirred at that temperature until the reaction is complete, preferably for about 30 minutes to 6 hours, most preferably from about 30 to 90 minutes, and drowned into ice water. The slurry is stirred for about 5 minutes to 6 hours, preferably from about 30 minutes to 3 hours, at a temperature from about 0 to 50° C., preferably from about 10 to 25° C. The inventive compounds are then isolated by filtration or centrifugation and are preferably washed with water. The resulting product cake can be dried or can be used in the form of an aqueous cake as an additive during the pigment synthesis.

In general a stochiometric amount of pigment, intermediate X and formaldehyde is used; however an excess of the intermediate X or formaldehyde may be used to achieve the desired product. Preferably, the molar ratio of the pigment: intermediate X:formaldehyde is 1:1 to 1.2:1 to 2.

If a high degree of sulfonation is desired, the reaction mixture is stirred at higher temperature, for example, above 60° C. If it is desirable to have a low degree of sulfonation, the reaction is maintained at lower temperature, for example, below 60° C.

The isolated samples can be analyzed by known methods, for example, by elementary analysis or mass spectrometry such as LCMS, GCMS or the matrix-assisted laser desorption ionization technique (MALDI) or by the HPLC method, all of which are well known to those of ordinary skill in the art. Using the preferred technical preparation method described above, which does not include specific cleaning steps, the purity of the isolated product is generally not 100% and contains, depending on the starting materials and reaction temperature, some remaining starting materials or other byproducts which, when in a concentration that does not impact the effect of the particle size and crystal phase director, are tolerated and can actually provide additional advantageous effects. By technically well known methods, such as solvent treatments, recrystallization or precipitation from basic polar solvent solutions, for example in basic dimethyl sulfoxide or dimethyl formamide, such products can be further purified, if desired.

Generally, the inventive pigment particle growth and crystal phase director compounds are added at a concentration of about 0.1 to 15 percent, preferably about 0.3 to 10 percent and most preferably about 0.5 to 8 percent, based on the pigment to be synthesized, before or during the final steps of pigment synthesis.

The inventive pigment particle growth and/or crystal phase directors are suitable as additives for the synthesis of pigments of several pigment classes including pigments of the anthraquinone, phthalocyanine, perinone, perylene, diketopyrrolopyrrole, thioindigo, iminoisoindoline, iminoisoindolinone, quinacridone, flavanthrone, dioxazine, indanthrone, anthrapyrimidine and quinophthalone pigment classes. Preferably, but not essentially, the pigment used in the pigment moiety Q of the inventive compounds belongs to the same pigment class as the pigment being synthesized.

The inventive compounds are particularly suitable for the synthesis of direct pigmentary grade diketo pyrrolopyrrole and quinacridones and/or its solid solutions. Said compounds are highly suitable for the synthesis of quinacridone pigments in their specific crystal modifications, such as the alpha, beta or gamma quinacridone, 2,9-dichloroquinacridone, 2,9-dimethyl-quinacridone, 4,11-dichloroquinacridone and solid solutions thereof. The inventive pigment particle growth directors are particularly effective when said pigment particle growth directors are completely or partially soluble in the reaction media in which the pigment is being synthesized.

A further embodiment of the present invention concerns a process for the direct synthesis of a pigmentary grade anthraquinone, phthalocyanine, perinone, perylene, diketopyrrolopyrrole, thioindigo, iminoisoindoline, iminoisoindolinone, quinacridone, flavanthrone, dioxazine, indanthrone, anthrapyrimidine or quinophthalone pigment wherein said pigment is synthesized in the presence of 0.1 to 25 weight percent of a pigment particle growth director of formula I, based on the weight pigment being synthesized.

Preferably, for the direct synthesis of a pigmentary grade quinacridone, quinacridone, 2,9-dichloroquinacridone, 4,11- dichloroquinacridone, 2,9-dimethylquinacridone, the pigment or solid solution thereof is synthesized in the presence of 0.1 to 25 weight percent of a pigment particle growth director compound of formula I, based on the weight pigment being synthesized.

In addition, the present invention concerns a process for the preparation of a direct pigmentary diketopyrrolopyrrole or quinacridone pigment or a solid solution thereof comprising the step of synthesizing said pigment or solid solution in the presence of 0.1 to 25 percent by weight of at least one compound of formula I based on the pigment being synthesized.

Without limiting this invention to any particular theory, it is believed that the inventive particle growth director molecule adheres to the synthesized pigment molecule and by doing so directs the crystal growth and crystal phase. The term "directing the crystal growth" refers to controlling the synthesis of pigment particles to have a suitable pigmentary size as well as directing the growth of the crystals to generate particles of a specifically desired shape, such as platelet, needle, cubic, leaflet, prismatic and other geometric forms, in a desired crystal phase. The effect can be influenced by the chemical structure of the organic pigment, the selection of the reaction media and the concentration and chemical structure of the inventive particle growth inhibitor.

During the isolation of the pigment, for example in the filtration step, these compounds—when soluble in the reaction media—can be washed out and if desirable, be recollected from the filtrate or wash liquid. Typically, these compounds are partially left on the pigment surface and can have additional benefits. Such benefits are, for example, improved pigment properties such as rheological properties, dispersibility and wetting behavior, flocculation resistance and improved heat stability.

In certain cases, it is advantageous to use the inventive compounds in mixture or in combination with other additives including known pigment particle growth inhibitors such as, for example, phthalimidomethyl-, imidazolmethyl- or pyrazolmethyl-quinacridone, pigment sulfonic acids or specific polymers; or other optional ingredients such as wetting agents, surfactants, defoamers, antioxidants, UV absorbers, light stabilizers, plastisizers, or general texture improving agents and so forth. Any such additional additives may be used as long as said additives are stable under the pigment synthesis conditions and have no negative impact on the final pigment properties or the environment. Generally such additives can be used in a concentration from about 0.1 to 25 percent, preferably from about 0.2 to 15 percent and most preferably from about 0.5 to 8 percent, based on the pigment to be synthesized. The resulting pigment/additive mixture can be used in any conventional pigment application, such as in the formation of paints, inks, color filters, fibers, paper and textiles.

Suitable polymers are, for example, polyacrylic acid, polymethacrylic acid, polymaleic anhydride, polyurethane, polyvinylether, polyvinylalcohol, polyalkylene glycol, polyethylene oxide, cellulose derivatives, polyimine, polyvinylpyridine, or copolymers such as copolymers of acrylic acid with styrene, acrylonitrile, vinylacetate, vinylphosphonate, vinylpropionate, vinylchloride, itaconic acid or maleic anhydride, or a mixture thereof, or polymeric derivatives like ethoxylated or propoxylated fatty amines such as ethoxylated cocoalkyl, oleyl or soyaalkyl amines; ethoxylated or propoxylated fatty quaternary salts such as ethoxylated cocoalkyltrimethyl ammonium chloride; ethoxylated fatty amides such as ethoxylated oleamides; alkyl-, cycloalkyl- or alkylaryloxypoly (ethylen-oxy) ethanol, cycloalkyloxypoly(ethylenoxy)laurate or oleate, polyethylene glycol 400 laurate or oleate, alkyl-, cycloalkyl- or alkylarylpoly(ethylenoxy)carboxylate or phosphonate.

Suitable surfactants include anionic surfactants such as alkylbenzene- or alkylnaphthalene-sulphonates, alkylsulfosuccinates or naphthalene formaldehyde sulfonates; cationic surfactants including, for example, quaternary salts such as benzyl tributyl ammonium chloride; or nonionic or amphoteric surfactants such as polyoxyethylene surfactants and alkyl- or amidopropyl betaines, respectively Suitable texture improving agents are, for example, fatty acids such as stearic acid or behenic acid, and fatty amines such as laurylamine and stearylamine. In addition, fatty alcohols or ethoxylated fatty alcohols, polyols such as aliphatic 1,2-diols or epoxidized soy bean oil, waxes, resin acids and resin acid salts may be used for this purpose.

Suitable UV stabilizers are, for example, the known benzotriazol derivatives known under the trade name TINUVIN or CIBA Fast H Liquid an aryl sulfonated benzotriazol, both being products of CIBA Specialty Chemicals Corporation.

Due to the ability to act as an antiflocculant as well as an excellent particle growth inhibitor and phase director, the inventive compounds can generally be used in the pigment finishing, pigment treatment, or pigment application such as an additive during the pigment dispersion step in bead mills, extruder, calendar and so forth, as well as during pigment synthesis. Also, the inventive compounds are themselves strongly colored and can be used as coloring agents, for example in the paints, inks, color filters, plastics, fibers, and in the paper or textile industry.

Additionally, many of the inventive compounds provide physical properties that are similar to those of pigments; specifically low solubility in organic solvents or the application media. Therefore, said compounds are non-bleeding and, for example, will not migrate into food when a pigment composition containing the inventive compound is used as a coloring agent in food packaging materials.

The following examples further describe some preferred embodiments of the invention, but do not limit the scope of the invention. In the examples, all parts are by weight unless otherwise indicated.

EXAMPLE 1

A one liter flask equipped with a stirrer, thermometer, condenser and drying tube was charged with 200 ml concentrated (95–98%) sulfuric acid. 46.8 grams (0.15 mol) MONASTRAL Red Y RT-759-D, an unsubstituted quinacridone pigment of CIBA Specialty Chemicals Corporation were added at a temperature below 45° C. and the mixture was stirred for 20 minutes at 40–45° C., to completely dissolve the pigment.

26.4 grams (0.15 mol) benzene sulfonic acid (90%) were added at a temperature below 45° C. and the mixture was stirred for 20 minutes at 40 to 45° C., followed by the rapid addition of 4.8 grams (0.16 mol) para formaldehyde. The reaction mixture was stirred for one hour at 55–60° C., then poured into 2.5 liter ice water. The precipitate was stirred for 2½ hours at room temperature, then filtered. The press cake was washed with water to a pH of 5 and dried yielding a product in which benzene sulfonic acid methyl quinacridone with the molecular weight of 482 was detected by MALDI.

EXAMPLE 2

A one liter flask equipped with a stirrer, thermometer, condenser and drying tube was charged with 200 ml concentrated (95–98%) sulfuric acid. 31.2 grams (0.1 mol) MONASTRAL Red Y RT-759-D were added at a temperature below 45° C. and the mixture was stirred for 20 minutes at 40–45° C. to completely dissolve the pigment.

41.4 grams (0.1 mol) naphthalin-1-sulfonic acid (50%) were added at a temperature below 45° C. and the mixture was stirred for 20 minutes at 40 to 45° C. followed by the rapid addition of 3.2 grams (0.107 mol) para formaldehyde. The reaction mixture was stirred for one hour at 55–60° C. then poured into 2.5 liter ice water. The precipitate was stirred for 2½ hours at room temperature, then filtered. The press cake was washed with water to a pH of 2.8 and kept as presscake. A small sample was further washed to a pH of 5 and dried yielding a product in which naphthalin-1-sulfonic acid methyl quinacridone having a molecular weight of 532 was detected by MALDI.

EXAMPLE 3

The procedure of Example 2 was repeated using 0.1 mol naphthalin-2 sulfonic acid instead of naphthalin-1-sulfonic acid to yield a product in which naphthalin-2-sulfonic acid methyl quinacridone having a molecular weight of 532 was detected by MALDI.

EXAMPLE 4

The procedure of Example 2 was repeated using 0.1 mol anthraquinone-2 sulfonic acid instead of naphthalin-1-sulfonic acid, yielding a product in which anthraquinone sulfonic acid methyl quinacridone having a molecular weight of 614 was detected by MALDI.

EXAMPLE 5

The procedure of Example 2 was repeated using 18.4 grams (0.1 mol) o-benzoic acid sulfimide sodium salt instead of naphthalin-1-sulfonic acid, yielding a product in which o-benzoic acid sulfimide methyl quinacridone having a molecular weight of 507 was detected by MALDI.

EXAMPLE 6

The procedure of Example 2 was repeated using 20.4 grams (0.1 mol) Naxonate ST, a commercially available sodium toluene sulfonate from Ruetgers-Naese (sodium toluene sulfonate with a content of 93%) instead of naphthalin-1-sulfonic acid, yielding a product in which toluene sulfonic acid methyl quinacridone having a molecular weight of 496 was detected by MALDI.

EXAMPLE 7

A one liter flask equipped with a stirrer, thermometer, condenser and drying tube was charged with 200 ml concentrated (95–98%) sulfuric acid. 28.8 grams IRGAZIN DPP Scarlet EK (0.1 mol of a commercial 3,6-diphenyl-1,4-diketopyrrol-[3,4-c]-pyrrole pigment from CIBA Specialty Chemicals Corp.) were added at a temperature of 40–45° C. and the mixture was stirred for 20 minutes at 40–45° C. to completely dissolve the pigment.

18.4 grams (0.1 mol) o-benzoic acid sulfimide sodium salt were added at a temperature below 45° C. and the mixture was stirred for 20 minutes at 40 to 45° C. followed by the rapid addition of 3.2 grams (0.107 mol) para formaldehyde. The reaction mixture was stirred for 50 minutes at 45–50° C. then poured into 2.5 liter ice water. The precipitate was stirred for 1½ hours at room temperature, then filtered. The press cake was washed with water neutral and dried yielding a red brown product in which o-benzoic acid sulfimide methyl 3,6-diphenyl-1,4-diketopyrrol-[3,4-c]-pyrrole having a molecular weight of 483 was detected by MALDI.

EXAMPLE 8

A one liter flask equipped with a thermometer, stirrer and condenser was charged with 40 grams 6,13-dihydroquinacridone, 180 ml methanol and 40.9 grams 50% aqueous sodium hydroxide. The mixture was stirred under a slow flow of nitrogen at 30–45° C. for five minutes. 2.4 grams of the pigment additive prepared according to Example 4, followed by 0.5 grams anthraquinone mono sulfonic acid sodium salt as catalyst, were added and the reaction mixture was heated to reflux for one hour generating the sodium salt of 6,13-dihydroquinacridone. 73.5 grams of an aqueous 16.9% hydrogen peroxide solution were added into the reaction mixture with a peristaltic pump at a rate of 0.3 ml/minute while maintaining reflux under a slow nitrogen flow. The resulting reddish suspension was further stirred for 10 minutes at reflux then diluted with 100 ml cold water and filtered. The presscake was washed with hot water then dried, yielding 38.9 grams red quinacridone.

The product showed a purity of above 98% quinacridone as determined by a spectrophotometric method. The x-ray diffraction pattern of the pigment shows the characteristics of an alpha quinacridone. A microscopic view of the pigment shows crystals having a length of 1 to 6 $\mu$m and a width of 0.2 to 0.6 $\mu$m. When incorporated into plastics or paints the pigment imparted a bright yellowish red color with excellent properties.

EXAMPLE 9

A one liter flask equipped with a thermometer, stirrer and condenser was charged with 45 grams 2,9-dichloro-6,13-dihydroquinacridone, 3.0 grams of the pigment additive prepared according to Example 1, 280 ml methanol and 136.8 grams 45% aqueous potassium hydroxide, which was stirred for 5 minutes at 30 to 40° C. The mixture was then stirred under a slow flow of nitrogen at reflux temperature for one hour generating the potassium salt of 2,9-dichloro-6,13-dihydroquinacridone. 0.6 grams of the sodium salt of anthraquinone-2-sulfonic acid was added. 67.8 grams of an aqueous 16.9% hydrogen peroxide solution were added at a pump setting of 0.3 ml/minute while maintaining reflux under a slow nitrogen flow over a period of 3 hours 20 minutes. The resulting magenta colored suspension was further stirred for 10 minutes at reflux temperature, diluted with 100 ml cold water, then filtered at 50–60° C. The presscake was washed with hot water then dried yielding 44 grams of magenta-colored 2,9-dichloroquinacridone pigment.

The x-ray diffraction pattern of the pigment showed the characteristics of a gamma 2,9-dichloroquinacridone. When incorporated in automotive paints the product produced a strong transparent magenta color dispersion with excellent rheological properties, and which can be easily sprayed on metallic panels generating coatings of excellent durability.

EXAMPLE 10

The procedure described in Example 9 was repeated using 1.8 grams, instead of 3.0 grams, of the pigment additive prepared according to Example 1, and 80 grams 50% sodium hydroxide instead of potassium hydroxide, yielding a strong magenta colored 2,9-dichloroquinacridone.

Incorporated in plastics the product produced a strong bluish magenta color with an excellent heat and light stability.

EXAMPLE 11

A one liter flask equipped with a thermometer, stirrer and condenser was charged with 40 grams 6,13-dihydroquinacridone, 180 ml methanol and 42 grams 50% aqueous sodium hydroxide and 14.6 grams of the aqueous presscake of the naphthalin-1-sulfonic acid methyl quinacridone pigment additive prepared according to Example 2. The mixture was stirred under a slow flow of nitrogen at 50–55° C. for one hour. 0.5 gram anthraquinone mono sulfonic acid sodium salt as catalyst were added and the reaction mixture was heated to reflux for one hour generating the sodium salt of 6,13-dihydro-quinacridone. 67 grams of an aqueous 19.3% hydrogen peroxide solution were added into the reaction mixture with a peristaltic pump at a pumping rate of 0.3 ml/minute, whereby after ½ hour addition time 1.2 grams phthalimidomethyl-quinacridone were introduced into the reaction mixture followed by continuing the hydrogen peroxide addition while maintaining reflux and a slow nitrogen flow. The resulting violet suspension was further stirred for 10 minutes at reflux then diluted with 100 ml cold water and filtered. The presscake was washed with hot water then dried, yielding 38.9 grams violet quinacridone.

The product shows a high purity and only 0.3% remaining 6,13-dihydro-quinacridone as determined by a spectrophotometric method. The x-ray diffraction pattern of the pigment shows the characteristics of a beta quinacridone. Incorporated in automotive paints the product produced a strong violet color dispersion with excellent rheological properties and a semi-transparent appearance when drawn on a contrast carton, and which can be easily sprayed on metallic panels generating coatings of excellent durability.

EXAMPLE 12

A one liter flask equipped with a thermometer, stirrer and condenser was charged with 50 grams 6,13-dihydroquinacridone, 310 ml methanol and 66 grams 50% aqueous sodium hydroxide and 3.8 grams 50% aqueous benzyl tributyl ammonium chloride solution and stirred for 5 minutes at 35–40° C. 0.9 grams anthraquinone sulfonic acid methyl quinacridone pigment additive prepared according to Example 4 was added followed by the addition of 0.5 grams anthraquinone mono sulfonic acid sodium salt as catalyst. The mixture was stirred under a slow flow of nitrogen and heated to reflux. 91.4 grams of an aqueous 17% hydrogen peroxide solution were added into the reaction mixture with a peristaltic pump at a pumping rate of 0.3 minute. The resulting red suspension was further stirred for 10 minutes at reflux then diluted with 100 ml cold water and filtered. The presscake was washed with hot water then dried, yielding 48.9 grams red quinacridone.

The x-ray diffraction pattern of the pigment shows the characteristics of a gamma-III quinacridone which is described in U.S. Pat. No. 5,223,624. It can be easily incorporated in paints and plastics providing strongly red colored articles.

EXAMPLE 13

Under a flow of nitrogen a one liter flask equipped with a thermometer, stirrer and condenser is charged with 100 ml tert.-amyl alcohol, 34.6 grams potassium tert. butylate and 144.4 grams of benzonitrile, and the mixture is heated to about 98° C. A substantially anhydrous solution of 14.6 grams of dimethyl succinate in 10 ml tert. amyl alcohol is added at 98–99° C. in 145 minutes using a metering pump and methanol is distilled of. After the complete addition the reaction mixture is stirred for 2 hours at 99° C. and 0.5 grams o-benzoic acid sulfimide methyl 3,6-diphenyl-1,4-diketopyrrol-[3,4-c]-pyrrole additive prepared according to Example 8 are added, then cooled to 65° C., diluted with 100 ml methanol followed by the addition of 250 ml water. The mixture is filtered. The presscake is washed neutral with water and dried, yielding 19 grams of a scarlet direct pigmentary diketopyrrolopyrrole pigment showing a high color strength, high saturation and good light stability when incorporated in paints and plastics.

EXAMPLE 14A

A beta quinacridone crude with a particle size of 2 to 6 $\mu$m as for example obtained by the oxidation of 6,13-dihydroquinacridone with hydrogen peroxide as the oxidant as described in U.S. Pat. No. 5,840,901 is premilled according to the following procedure:

A 1-SDG Attritor™ mill manufactured by Union Process, Inc. Akron, Ohio, which is fitted with L-arms and contains 3.78 liters of 0.6 cm diameter ceramic grinding media with 7.5 MOH hardness, 60–65 Rockwell 45 N hardness, 3.0 kg/cm impact strength and 8500 kg/cm compressive strength. The mill is charged with 350 grams of the beta quinacridone crude and the pigment is milled under a nitrogen flow at a rotation speed of 500 RPM for 50 minutes. At the conclusion of the milling cycle, the product is recovered by opening the valve at the bottom of the mill while rotation continues for 15 minutes yielding a brown highly aggregated powder with a very low crystallinity.

EXAMPLE 14B

A one liter flask equipped with a thermometer, stirrer and condenser was charged with 0.3 grams of the o-benzoic acid sulfimide methyl quinacridone additive prepared according to Example 5 and 250 ml DMF (dimethylformamide). The mixture was stirred at 50–55° C. for 15 minutes whereby the additive was partially dissolved in the solvent. 30 grams of the above premilled powder from Example 14A is added and the suspension was stirred for 3 hours at 50–55° C. The resulting violet suspension was filtered. The press cake was washed with water and dried yielding a violet pigment which shows excellent durability and a high chroma when incorporated in paints and plastics. The X-ray diffraction pattern shows the characteristic of a beta quinacridone.

EXAMPLE 15

63.0 grams of polyvinylchloride, 3.0 grams epoxidized soy bean oil, 2.0 grams of barium/cadmium heat stabilizer, 32.0 grams dioctyl phthalate and 1.0 gram of the beta quinacridone prepared according to Example 11 were mixed together in a glass beaker using a stirring rod. The mixture was formed into a soft PVC sheet with a thickness of about 0.4 mm by rolling for 8 minutes on a two roll laboratory mill at a temperature of 160° C., a roller speed of 25 rpm and friction of 1:1.2 by constant folding, removal and feeding. The resulting soft PVC sheet was colored in an attractive violet shade with excellent fastness to heat, light and migration.

EXAMPLE 16

Five grams of the magenta 2,9-dichloroquinacridone pigment prepared according to Example 10, 2.5 grams hindered amine light stabilizer, 1.0 gram benzotriazole UV absorber, 1.0 gram hindered phenol antioxidant and 1.0 gram phosphite process stabilizer were mixed together with 1000 grams of high density polyethylene at a speed of 175–200 rpm for 30 seconds after flux. The fluxed, pigmented resin was chopped up while warm and malleable, and then fed through a granulator. The resulting granules were molded in an injection molder with a 5 minute dwell time and a 30 second cycle time at temperatures of 260° C. Homogeneously colored chips which show a bright magenta color with excellent light stability were obtained.

EXAMPLE 17

Preparation of Automotive Paint
Millbase Formulation

A pint jar was charged with 66 grams acrylic resin, 14.5 grams AB dispersant and 58.1 grams solvent (SOLVESSO 100 from American Chemical). 26.4 grams quinacridone pigment obtained according to Example 12 and 980 grams of 4 mm diameter steel diagonal rods were added. The mixture was milled in the jar for 64 hours on a roller mill. The resulting millbase contained 16.0% pigment with a pigment/binder ratio of 0.5 and a total non-volatile content of 48.0%.

Masstone Color 47.3 grams of the above millbase, 36.4 grams of clear solids color solution containing a melamine resin catalyst, non-aqueous dispersion resin and a UV absorber, and 16.3 grams of a balanced clear solid color solution containing a polyester urethane resin were mixed and diluted with a solvent mixture containing 76 parts xylene, 21 parts butanol and 3 parts methanol to a spray viscosity of 20–22 seconds, as measured by a #2 Fisher Cup.

The resulting red resin/pigment dispersion was sprayed onto a panel twice at 1.5 minute intervals as a basecoat. After 2 minutes, clearcoat resin was sprayed twice at 1½ minute intervals onto the basecoat. The sprayed panel was then flashed with air in a flash cabinet for 10 minutes and then "baked" in an oven at 265° F. (129° C.) for 30 minutes, yielding a high chroma red colored panel, with excellent weatherability.

EXAMPLE 18

1000 grams of polypropylene granules (DAPLEN PT-55®, from Chemie Linz) and 10 grams of the 2,9-dichloroquinacridone pigment obtained in Example 9 were thoroughly mixed in a mixing drum. The granules so obtained were melt spun at 260–285° C. to magenta colored filaments of good light fastness and textile fibers properties.

In addition to the embodiments described above, numerous variations of these embodiments can be made in accordance with this invention, the scope of which should be considered limited only by the language of the appended claims.

What is claimed:

1. A compound of formula I

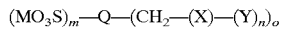
(I)

wherein:

Q represents quinacridone;

M represents a metal cation, quaternary N cation or H;

X is an aromatic group is phenylene, naphthalene, toluene, ortho- meta- or para-xylene, chlorobenzene, ortho- meta- or para-dichlorobenzene, 1- or 2-methylnaphthalene or anthraquinone anthracene, phenanthrene, pyrene or perylene, a cyclo-hetero aliphatic group selected from a group consisting of pyrrolidine, imidazolidine, piperidine, piperazine, morpholine and barbituric acid or a hetero aromatic group selected from a quinoline or carbazole group;

Y is a sulfonic or carboxylic acid or salt thereof;

m and n independently from each other represent an integer from 0 to 2.5; and o is an integer from 0.05 to 4 with the proviso that when X is phenylene, m is not 0.

2. A compound of claim 1, wherein the pigment is a quinacridone of the formula II:

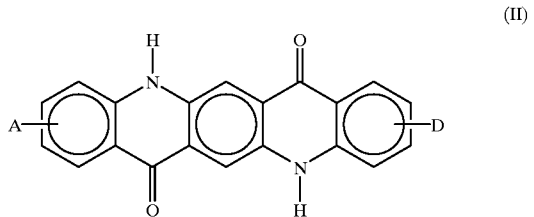
(II)

wherein A and D are independently substituents selected from H, F, Cl, $C_1$–$C_3$alkyl and $C_1$–$C_3$alkoxy.

3. A compound of claim 1, wherein the pigment is an unsubstituted quinacridone.

4. A compound of claim 1, wherein the metal cation M is sodium, potassium, calcium, magnesium or aluminum.

5. A compound of claim 1, wherein said aromatic group is phenylene, naphthalene, anthracene, phenanthrene, pyrene or perylene.

6. A compound of claim 5, wherein the aromatic group is a phenylene or naphthalene.

7. A compound of claim 1, wherein said cyclo-hetero aliphatic group is barbituric acid.

8. A compound of claim 1, wherein said aromatic, cyclo-hetero aliphatic or hetero-aromatic group is substituted with one or more halogen, oxy, hydroxy, imino, amino, $C_1$–$C_{18}$alkyl or $C_1$–$C_{18}$ alkoxy groups.

9. A compound of claim 8, wherein said aromatic, cyclo-hetero aliphatic or hetero-aromatic group is substituted with one or more $C_1$–$C_3$alkyl or $C_1$–$C_3$ alkoxy groups.

10. A compound of claim 1, wherein Y is a free carboxylic acid or sulfonic acid group or a sodium, potassium, magnesium, calcium or aluminum salt thereof.

11. A compound of claim 10, wherein Y is a free sulfonic acid group or a sodium, potassium or aluminum salt thereof.

12. A compound of claim 1, wherein m represents an integer from 0–0.1, n represents an integer 0–1.2, and o represents an integer from 0.2 to 1.5.

13. A process for the preparation of a compound of claim 1, wherein:

A) dissolving a pigment of the pigment moiety Q in concentrated sulfuric acid;

B) adding and dissolving at temperature less than 50° C. the intermediate X to the solution;

C) adding para-formaldehyde at a temperature less than 50° C.;

D) heating the mixture of step C) to about 50 to about 100° C.;

E) isolating a precipitate from the reaction in step D.

14. A process according to claim 13 wherein the mixture is heated in step D for about 30 minutes to about 6 hours and wherein the process further comprises the step of drowning the reaction mixture from step D in water to provide a precipitate.

15. A process according to claim 13, wherein the molar ratio of the pigment moiety Q: intermediate X: formaldehyde is 1:1 to 1.2:1 to 2.

16. A process for the direct synthesis of a pigmentary grade anthraquinone, phthalocyanine, perinone, perylene, diketopyrrolopyrrole, thioindigo, iminoisoindoline, iminoisoindolinone, quinacridone, flavanthrone, dioxazine, indanthrone, anthrapyrimidine or quinophthalone pigment wherein said pigment is synthesized in the presence of 0.1 to 25 weight percent of a pigment particle growth and/or crystal phase director compound of claim 1, based on the weight pigment being synthesized.

17. A process for the preparation of a direct pigmentary diketopyrrolopyrrole or quinacridone pigment or a solid solution thereof comprising the step of adding to the reaction mixture from which said pigment or solid solution is synthesized, 0.1 to 25 percent by weight of at least one compound of claim 1, based on the pigment being synthesized.

18. A process according to claim 17, wherein said pigment or solid solution is quinacridone, 2,9-dichloroquinacridone, 4,11-dichloroquinacridone, 2,9-dimethylquinacridone pigment or solid solutions thereof.

19. A method of improving the heat stability, rheological and flocculation properties of pigment particles, said method comprising adding to said pigment particles at least one compound of claim 1 in an amount sufficient to reduce flocculation or improve the heat stability.

* * * * *